United States Patent [19]

Sato

[11] Patent Number: 4,570,111
[45] Date of Patent: Feb. 11, 1986

[54] FIRING ANGLE CONTROL SYSTEM

[75] Inventor: Hirokazu Sato, Tokyo, Japan

[73] Assignee: Kabushiki Kaisha Toshiba, Kawasaki, Japan

[21] Appl. No.: 731,516

[22] Filed: May 7, 1985

Related U.S. Application Data

[63] Continuation-in-part of Ser. No. 584,507, Feb. 28, 1984, abandoned.

Foreign Application Priority Data

Mar. 3, 1983 [JP] Japan .................................. 58-33792

[51] Int. Cl.$^4$ .............................................. H02P 5/16
[52] U.S. Cl. ...................... 318/338; 318/257; 318/376; 318/345 C; 318/341
[58] Field of Search ............... 318/139, 257, 317, 318, 318/333, 336, 338, 341, 342, 344, 345 C, 345 G, 493, 376, 377, 378, 381; 361/33, 90, 91

[56] References Cited

U.S. PATENT DOCUMENTS

| | | | |
|---|---|---|---|
| 3,538,412 | 11/1970 | Giraf et al. | 318/257 X |
| 3,950,684 | 4/1976 | Peterson | 318/338 |
| 4,300,079 | 11/1981 | Kawada et al. | 318/338 X |
| 4,422,022 | 12/1983 | Hill et al. | 318/376 |
| 4,481,448 | 11/1984 | Bishop | 318/338 X |

Primary Examiner—B. Dobeck
Assistant Examiner—Shik Luen Paul Ip
Attorney, Agent, or Firm—Schwartz, Jeffery, Schwaab, Mack, Blumenthal & Evans

[57] ABSTRACT

In a firing angle control system for a converting device for an AC electric motor-vehicle fed with AC electric power and having, as its main electric motor, a DC electric motor, the converting device including a main rectifier connected to the armature and a field rectifier connected to the field winding, an abrupt change in the AC voltage of the converting device is detected and, upon such detection, a main rectifier voltage target signal is corrected to compensate for a difference in the rate of change between the armature current and the field current which would occur if the correction were not made.

9 Claims, 32 Drawing Figures

|  | POWER RUNNING | | | REGENERATIVE BRAKING | | |
|---|---|---|---|---|---|---|
|  | P1 | P2 | P3 | B1 | B2 | B3 |
| PWR | 1 | 1 | 1 | 0 | 0 | 0 |
| 1NP | 1 | 1 | 1 | 0 | 0 | 0 |
| 2NP | 0 | 1 | 1 | 0 | 0 | 0 |
| 3NP | 0 | 0 | 1 | 0 | 0 | 0 |
| Iat | 800A | 800A | 800A |  |  |  |
| Edmax | 500V | 700V | 1000V |  |  |  |
| RBR | 0 | 0 | 0 | 1 | 1 | 1 |
| 1NB | 0 | 0 | 0 | 1 | 1 | 1 |
| 2NB | 0 | 0 | 0 | 0 | 1 | 1 |
| 3NB | 0 | 0 | 0 | 0 | 0 | 1 |
| Iat |  |  |  | 300A | 500A | 700A |

FIRING ANGLE CONTROL SYSTEM

CROSS-REFERENCE TO A RELATED APPLICATION

This application is a continuation-in-part of my application Ser. No. 584,507, filed Feb. 28, 1984, entitled FIRING ANGLE CONTROL SYSTEM and now abandoned.

BACKGROUND OF THE INVENTION

The present invention relates to a firing angle control system for a converting device for an AC electric motor vehicle, such as train, having a motor operating as a separately excited motor both during power running and regeneration.

Figure 1:
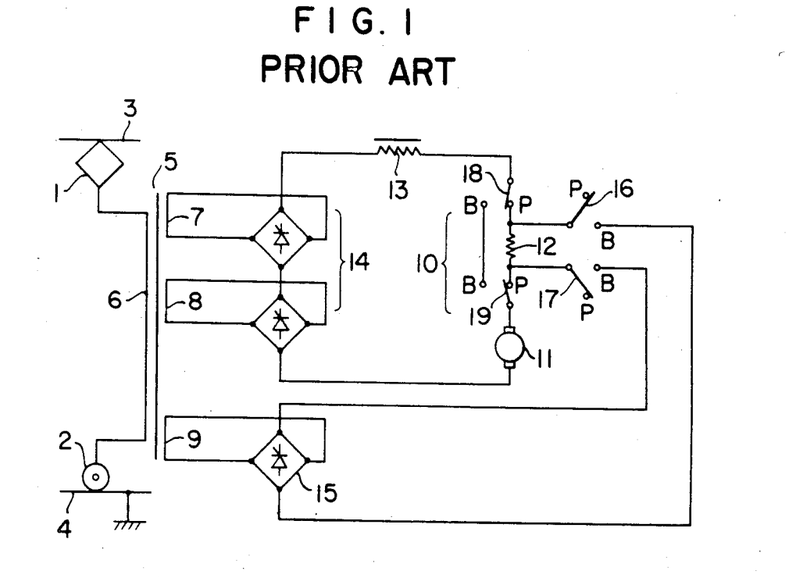
FIGS. 1 and 2 are circuit diagrams showing prior art arrangements.

FIG. 1 shows conventional main circuitry including a power converting device for an AC electric motor vehicle. Pantographs 1 and wheels 2 of the vehicle are used to transmit the voltage across an overhead wire 3 and rails 4 to a primary winding 6 of a transformer 5. Connected to secondary windings 7-9 of the transformer 5 are an armature 11 and a field winding 12 of a main motor 10, a smoothing reactor 13, a main rectifier 14 and a field rectifier 15. During power running, switches 16-19 are turned to the side "P" i.e., in the states as illustrated, so that the field winding 12 is in series with the armature, and the main motor 10 operates as a series motor. During regeneration, the switches 16-19 are on the side "B", so that the field winding 12 is separated and the motor operates as a separately excited motor. This arrangement is disadvantageous in that switches 16-19, and related components are required, and hence the entire arrangement is bulky and heavy.

Figure 2:
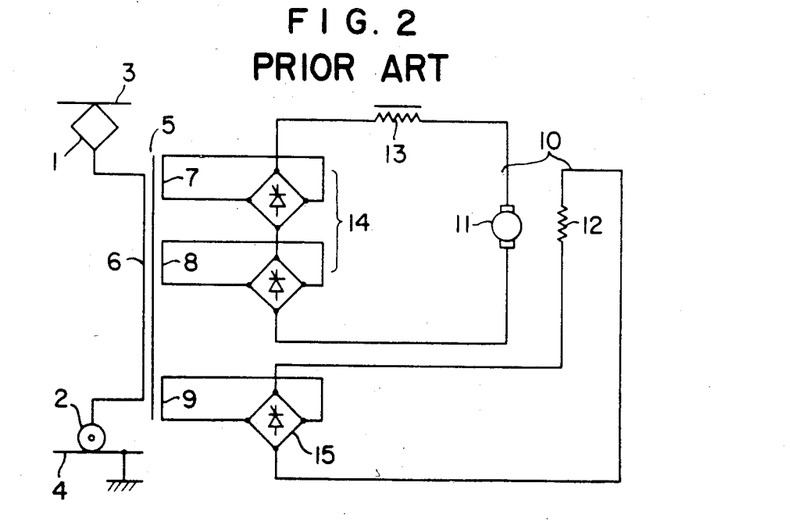

To simplify the circuitry and to reduce the weight of the components, an arrangement was conceived wherein, as shown in FIG. 2, a motor 10 is connected to operate as a separately excited motor both during power running and during regeneration. But with this arrangement, a flashover (short-circuiting between commutator brushes) often occurs in the motor 10 upon abrupt rise of the feed voltage (primary voltage). This arrangement therefore has not been actually used despite the advantages of simpler circuitry and reduced weight.

SUMMARY OF THE INVENTION

An object of the invention is to provide a firing angle control system for a converting device used in an AC electric motor vehicle, with which the main motor operates as a separately excited motor both during power running and during regeneration so that the circuitry is simple and the arrangement is of reduced weight while flashover is avoided even when the primary voltage abruptly rises.

According to the invention, there is provided a firing angle control system for a converting device for an AC electric motor-vehicle fed with an AC electric power and having, as its main electric motor, a DC electric motor, the converting device including a main rectifier and a field rectifier, the main rectifier including gate controlled rectifier elements and being adapted to convert AC electric power into DC electric power to be supplied to the armature of the DC electric motor during power running, and to invert DC electric power which is generated by the DC electric motor into AC electric power during regeneration, and the field rectifier including gate controlled rectifier elements and being adapted to convert AC electric power into DC electric power to be supplied to the field winding of the DC electric motor, the control system comprising:

a voltage determining circuit receiving operation command signals including a power running/regeneration command signal and a notch command signal from a master controller, and an armature current signal indicative of a detected armature current and a field current signal indicative of a detected field current, and determining target values of the DC voltages of the main rectifier and the field rectifier, and producing a main rectifier voltage target signal indicative of the target value of the DC voltage of the main rectifier and a field rectifier voltage target signal indicative of the target value of the DC voltage of the field rectifier, an abrupt change detection circuit monitoring the AC voltage of the converting device and producing an abrupt change detection signal when it detects an abrupt change in the AC voltage, a correction circuit receiving the main rectifier voltage target signal and the abrupt change detection signal, and producing a corrected main rectifier voltage signal, a main rectifier firing angle determining circuit determining, in accordance with the corrected main rectifier voltage signal, the firing angle of each of the gate controlled rectifier elements of the main rectifier and producing firing pulses for the respective gate controlled rectifier elements at the respective firing angles, and a field rectifier firing angle determining circuit determining, in accordance with the field rectifier voltage signal, the firing angle of each of the gate controlled rectifier elements of the field rectifier and producing firing pulses for the respective gate controlled rectifier elements at the respective firing angles, the corrected main rectifier voltage signal having a value determined to compensate for a difference in the rate of change between the armature current and the field current which would occur after the abrupt change if the correction were not made.

DETAILED DESCRIPTION OF THE PREFERRED EMBODIMENTS

Figure 3A:
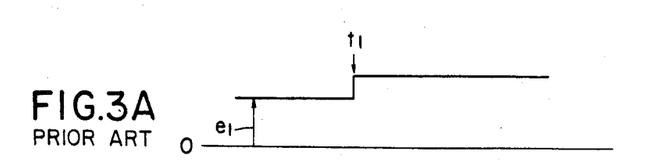
FIGS. 3a-3e are time charts showing variation in various voltages and currents.
Figure 3B:
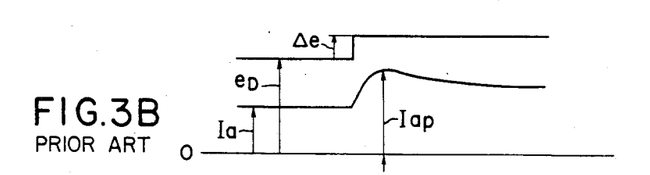
Figure 3C:
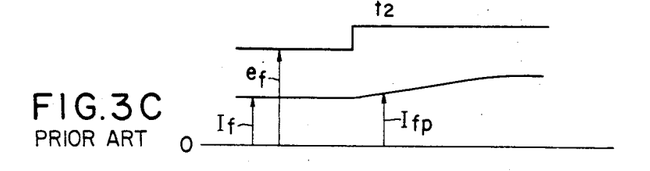

Before describing the embodiments of the invention, some analysis is given on the reason why flashover occurs when the primary voltage abruptly rises. If the primary voltage $e_1$ abruptly changes at a time point $t_1$ in FIG. 3, the main rectifier output voltage $e_D$ and the field rectifier output voltage $e_f$, which are secondary voltages, also abruptly rise. The armature current $I_a$, which flows through a circuit having a relatively small time constant, also abruptly rises (FIG. 3(b)), while the field current $I_f$, which flows through a circuit of a relatively large time constant, rises but slowly (FIG. 3(c)). As a result, at a certain time point $t_2$ ($I_a = I_{ap}$ (peak current), $I_f = I_{fp}$), the ratio of $I_f$ to $I_a$, i.e., weak field ratio $I_f/I_a$ becomes very small. With this small weak field ratio, the commutation is poor, sparks occur on the commutator brushes, and ultimately flash over may occur.

Figure 3D:
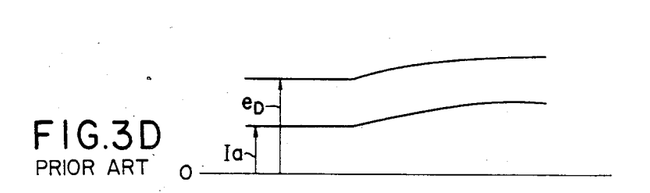
Figure 3E:
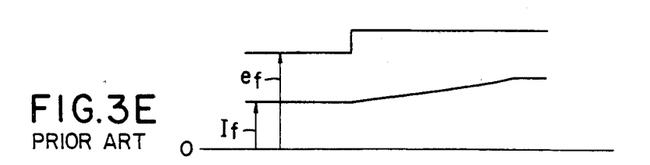

Since the flashover occurs because the weak field ratio becomes small, it can be avoided if the weak field ratio is controlled not to be small when the primary voltage abruptly rises. To prevent the weak field ratio from becoming small, the rise of the current $I_a$ should be kept small or zero. To achieve this, the invention teaches that the main rectifier output voltage $e_D$ be controlled to change slowly upon abrupt rise in the primary voltage $e_1$ as shown in FIGS. 3(d) and (e).

Figure 4:
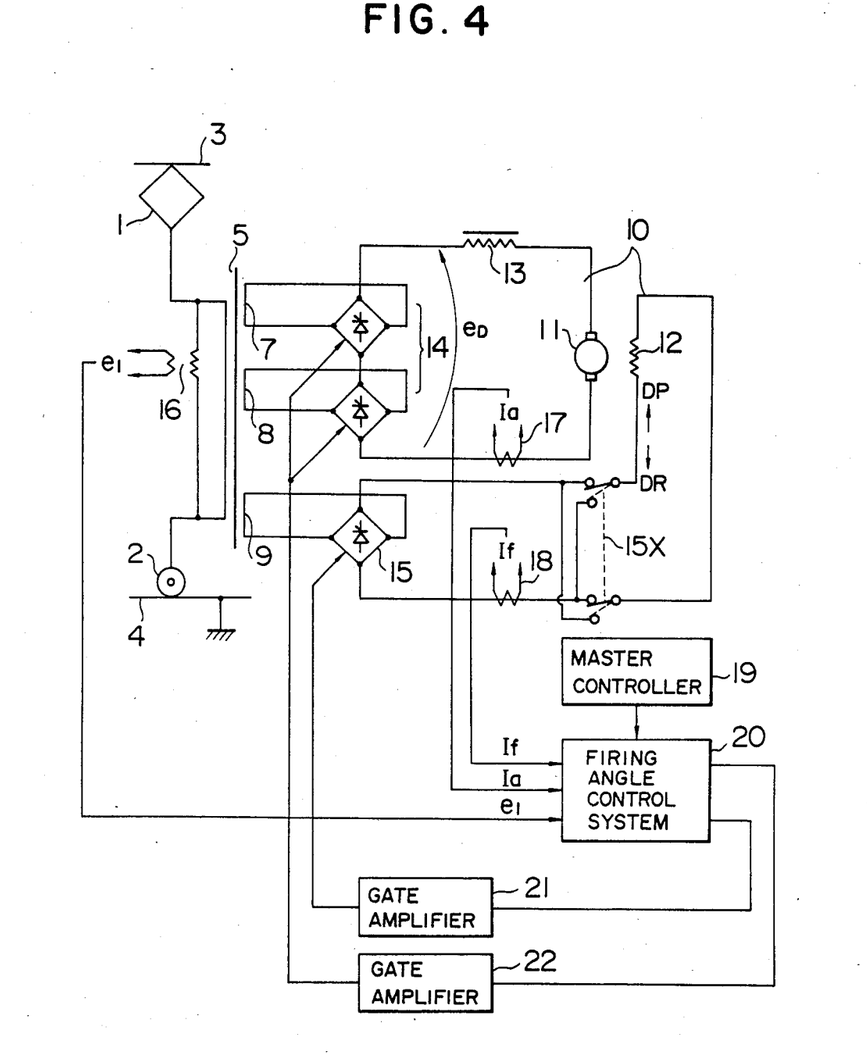
FIG. 4 is a diagram showing an arrangement incorporating a firing angle control system according to the invention.

FIG. 4 shows main circuitry of an AC electric motor vehicle in which the control system of the invention can be incorporated. The same reference numerals as in FIGS. 1 and 2 are used to designate similar components.

A switch 15X is provided to change the polarity of the connection of the filed rectifier 15 depending on whether the power running mode is selected or the regeneration mode is selected. More particularly, when the power running mode is selected, the switch 15X is in a state shown by solid lines to permit a current to flow in the direction of an arrow DP. When the regeneration mode is selected, the switch 15X is in a state shown by broken lines to permit a current to flow in the direction of an arrow DR. The operation of the switch 15X is controlled by a power running/regeneration command signal which will be described later.

Connected to the primary winding 6 is a voltage transformer (PT) 16 which detects the primary voltage $e_1$. An armature current $I_a$ flowing through the armature 11 of a DC electric motor 10 is detected by a direct current transformer (DCCCT) 17. Similarly, a field current $I_f$ flowing through the field winding 12 is detected by a direct current transformer 18. The signals $e_1$, $I_a$, $I_f$ (the signals indicative of the voltage $e_1$ and the currents $I_a$, $I_f$ respectively are also identified by the same reference characters) are applied to a firing angle control system 20, to which operation command signals, including a power running/regeneration command signal and a notch command signal, from a master controller 19 are also applied. The master controller 19 is manipulated by the motorman of the vehicle and governs the operation of the entire vehicle.

Figure 12:
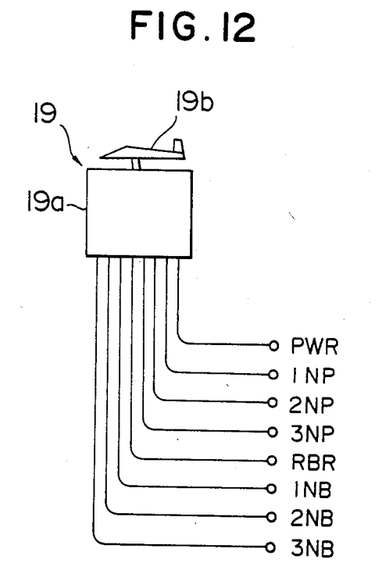
FIG. 12 is a schematic side view of an example of master controller.
Figure 13:
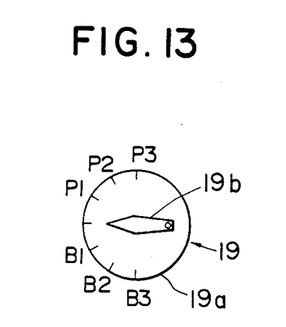
FIG. 13 is a plan view of the master controller of FIG. 12.
Figure 14:
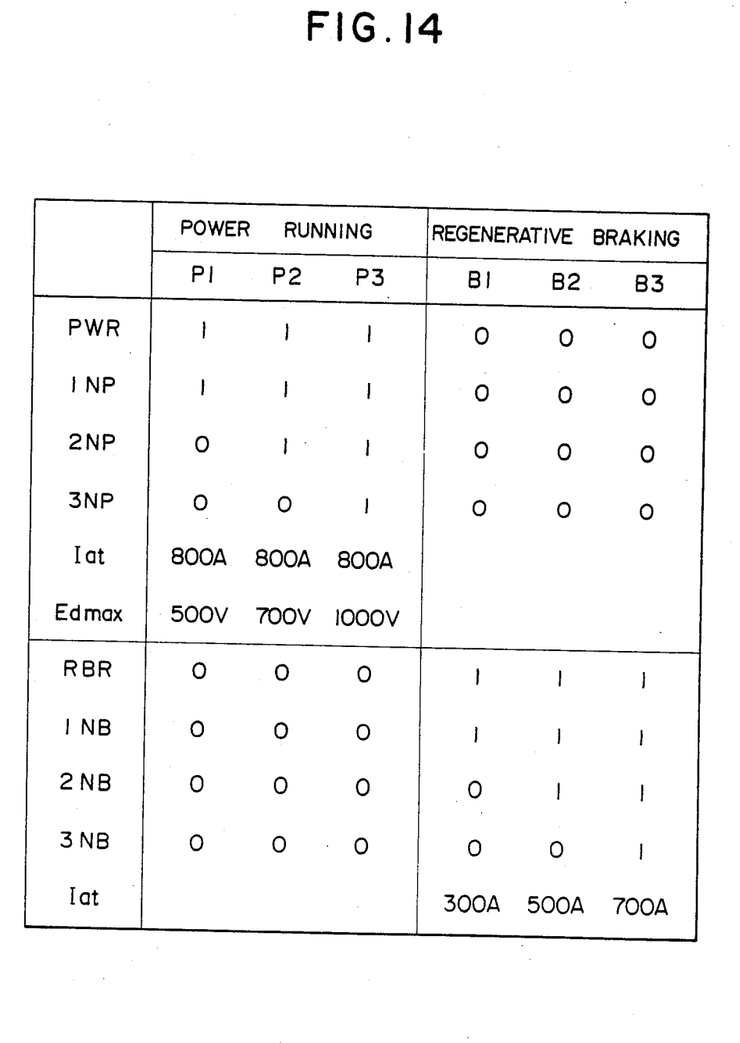
FIG. 14 is a table showing the logic levels of the signals outputted by the master controller.

FIGS. 12 and 13 show an example of master controller 19. The master controller 19 of this example comprises a box 19a and a handle 19b rotatably mounted on the box 19a and is manually rotated by the motorman. The handle 19b is capable of assuming or resting at a plurality of positions marked P1, P2, P3, B1, B2 and B3. The master controller 19 is also provided with a plurality of output terminals or leads PWR, 1NP, 2NP, 3NP, RBR, 1NB, 2NB and 3NB, at which logic signals assuming either "1" or "high" level, or "0" or "low" level appear. The logic levels of the signals appearing at the output terminals depend on the position which the handle 19b is assuming. The relationship between the position of the handle and the logic levels of the signals is shown in FIG. 14.

Of the various signals produced by the master controller, those appearing at the terminals PWR and RBR constitute the power running/regeneration command signal, and those appearing at the terminals 1NP, 2NP, 3NP, 1NB, 2NB and 3NB constitute the notch command signal.

The firing angle control system 20 serves to provide firing signals or pulses for controlled rectifier elements such as thyristors. The firing pulses are amplified by gate amplifiers 21, 22 and applied to the gates of thyristors of the rectifiers 14, 15. Control of the motor 10 is thus achieved. The power running/regeneration command signal is for selection of the mode of operation of the motor. The notch command signal designates the maximum armature voltage $E_{dmax}$ of the motor as well as a target value of the armature and field current of the motor. An example of the maximum armature voltage and the current target value for each notch is shown in FIG. 14. As shown, during power running, the target current $I_{at}$ is the same for all of the notches, while maximum voltage $E_{dmax}$ differs depending on the notch. During regeneration, the target current $I_{at}$ differs depending on the notch.

Figure 5:
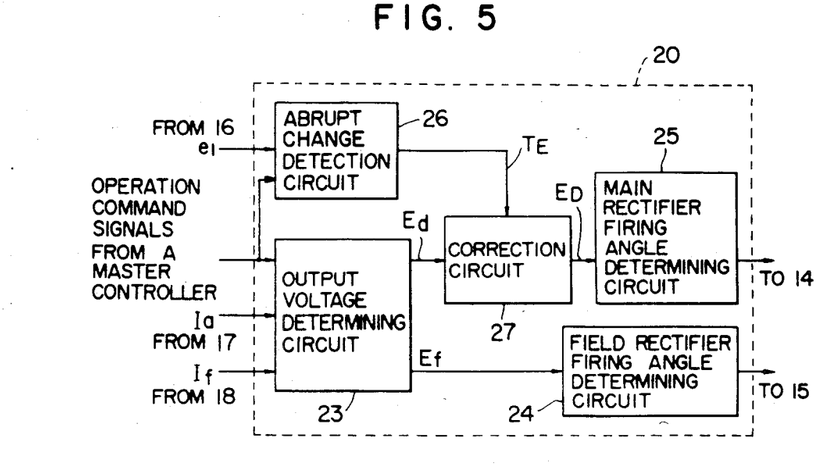
FIG. 5 is a block diagram showing an embodiment of a firing angle control system according to the invention.

FIG. 5 shows an example of the firing angle control system 20. An output voltage determining circuit 23 receives the operation command signals (power running/regeneration command signal, notch command signal, etc.), the detected armature current $I_a$ and the detected field current $I_f$, and determines, in accordance with them, a target value $E_d$ of the DC voltage to be produced by the main rectifier 14 so that the armature current becomes equal to the target current value designated by the notch command signal, and a target value $E_f$ of the DC voltage to be produced by the field rectifier 15 so that the field current becomes equal to the armature current, and produces a main rectifier voltage signal $E_d$ indicative of the target value $E_d$ and a field rectifier voltage signal $E_f$ indicative of the target value $E_f$.

Figure 15:
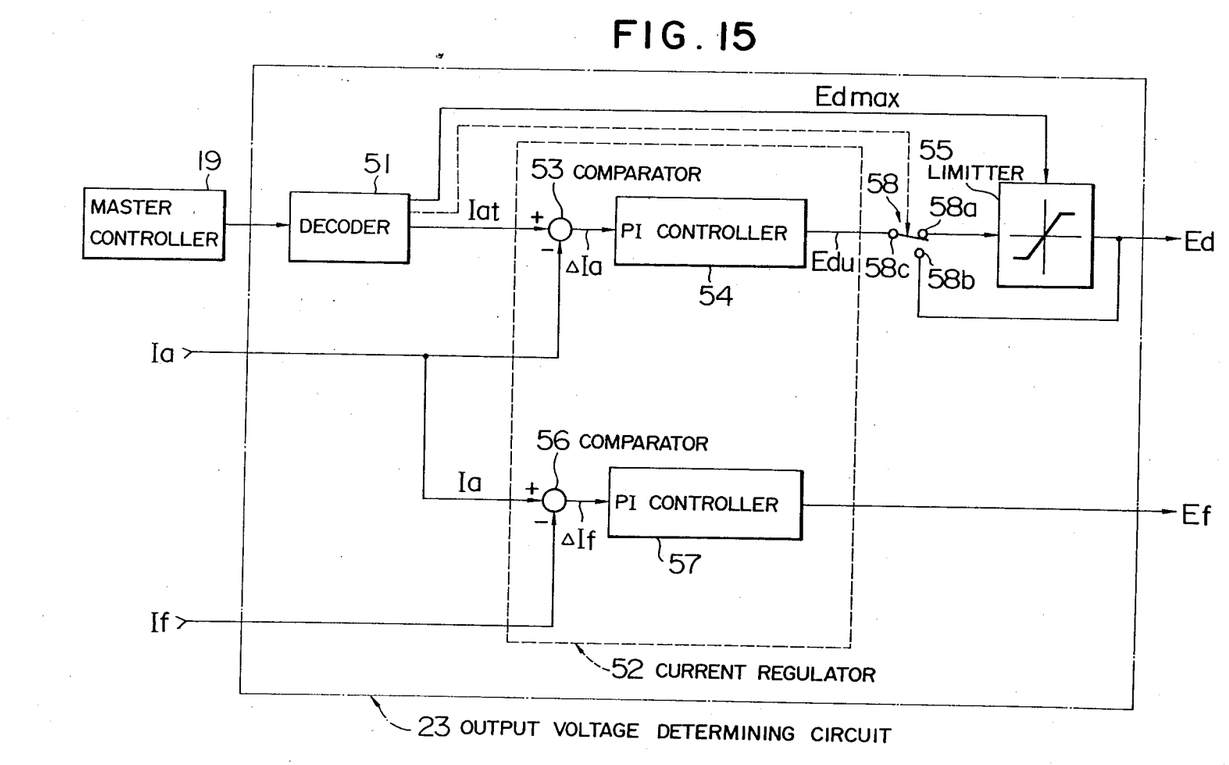
FIG. 15 is a block diagram showing an example of output voltage determining circuit.

FIG. 15 shows an example of the output voltage determining circuit 23. It comprises a decoder 51 receiving and decoding the operation command signals (including notch instruction and the power running/regeneration command signal) from the master controller 19 and producing signals indicative of a target value $I_{at}$ of the armature current, and a maximum output voltage $E_{dmax}$ of the main rectifier, in accordance with the notch command signal. The decoder 51 also controls a switch 58 according to the power running/regeneration command. More particularly, when the power running mode is selected, the switch is in a state as illustrated, i.e., connecting the contacts 58a and 58c. When the regeneration mode is selected, the switch is connecting the contacts 58b and 58c.

The output voltage determining circuit 23 also comprises a current regulator 52 performing PI (proportional plus integral) control. It comprises a comparator 53 receiving the detected armature current $I_a$ and the target value $I_{at}$ to determine the deviation $\Delta I_a$ of the former from the latter. A PI controller 54 performs a PI control action on the deviation $\Delta I_a$ to determine a first or unlimited target value $E_{du}$.

A limitter 55 is provided to limit the target value $E_d$ during power running. When the power running mode is selected, the contacts 58a and 58c are connected together so that the limitter 55 receives the first target value $E_{du}$ and the maximum output voltage $E_{dmax}$ of the main rectifier and limits the value of the former to the latter to produce a second or limited target value $E_d$.

When the regeneration mode is selected, the contacts 58b and 58c are connected together, so that the output $E_{du}$ of the PI controller 54 is produced as the voltage reference $E_d$, without being subjected to limitation by the limitter 55.

The current regulator 52 also comprises a comparator 56 receiving the detected field current $I_f$ and the detected armature current $I_a$ to determine the deviation $\Delta I_f$ of the former from the latter. A PI controller 57 performs a PI control action to determine a target value $E_f$. Thus, the output voltage of the field rectifier is controlled so that the field current $I_f$ becomes equal to the armature current $I_a$ serving as a target value. This is to obtain a series characteristic. In this way, the output voltage determining circuit 23 generates, within the circuit 23, a target current $I_{at}$ corresponding to the notch instruction from the master controller 19 and controls the output voltages of the main and the field rectifiers so as to achieve a PI control over the armature current and the field current. When the output voltage of the main rectifier (as applied to the motor armature) reaches a DC voltage (maximum output voltage $E_{dmax}$) corresponding to the inputted notch command, the output voltage of the main rectifier is held at that value.

Through such a control, the value of the target value $E_d$ becomes a positive value during power running, while it becomes a negative value during regeneration.

A field rectifier firing angle determining circuit 24 receives the signal $E_f$ and determines, in accordance with it, the firing angle of the thyristors of the field rectifier 15, and produces firing pulses at the determined firing angles, thereby to control the actual voltage $e_f$ to be identical to $E_f$.

A main rectifier firing angle determining circuit 25 similarly determines the firing angle of the thyristors of the main rectifier 14 and produces firing pulses at the determined firing angles. But it uses a corrected target value $E_D$ rather than the target value $E_d$. How the corrected target value $E_D$ is derived will be described later.

Figure 18:
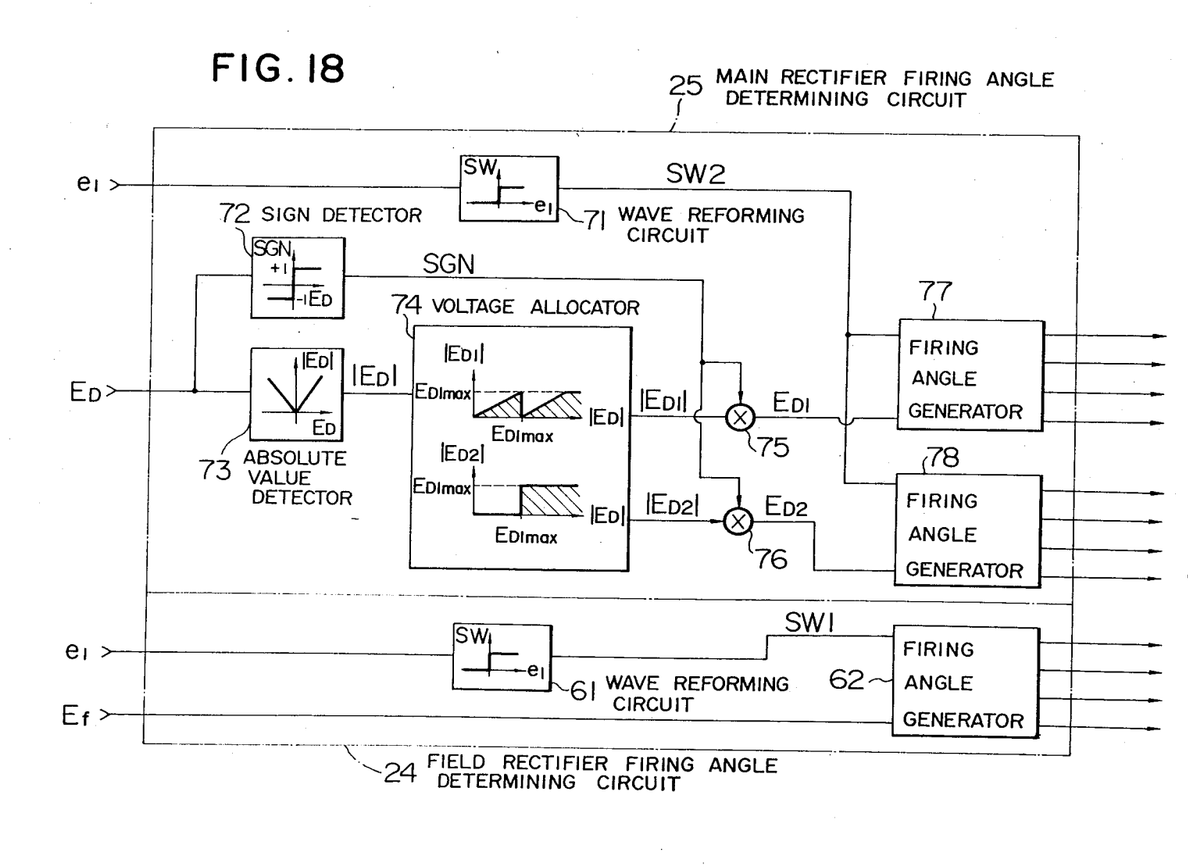
FIG. 18 is a block diagram showing an example of main and rectifier firing angle determining circuits.

FIG. 18 shows an example of the field rectifier firing angle determining circuit 24 and the main rectifier firing angle determining circuit 25.

Figure 17:
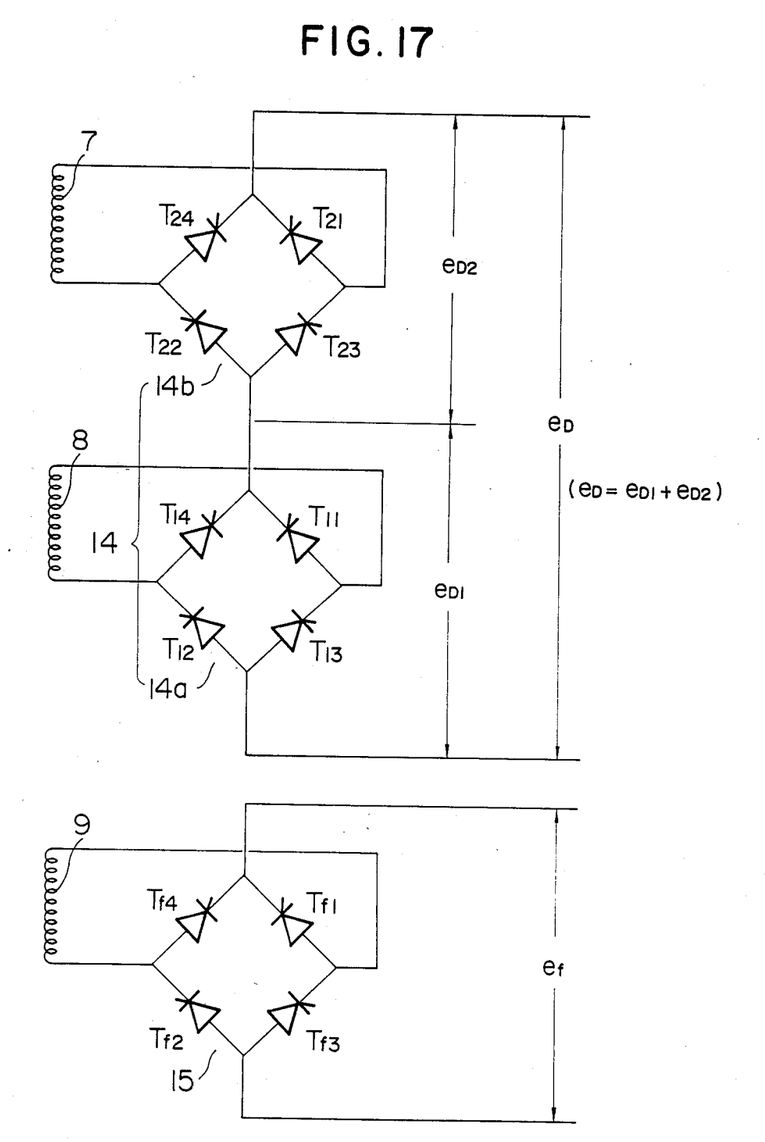
FIG. 17 is a circuit diagram of a main and a field rectifier circuits showing the voltages at various portions.

Before describing the circuits 24 and 25 in detail, the arrangement of the main rectifier 14 and the field rectifier 15 will be described in further detail. As shown in FIG. 17, the main rectifier 14 of the illustrated example comprises two rectifier bridges 14a and 14b whose DC terminals are connected in series with each other. The DC voltage $e_D$ of the entire rectifier 14 is the sum of the DC voltage $e_{D1}$ and $e_{D2}$ of the rectifier bridges 14a and 14b. The rectifier bridge 14a is formed essentially of thyristors T11–T14 constituting the arms of the bridge. The rectifier bridge 14b is formed essentially of thyristors T22–T24 constituting the arms of the bridge.

The field rectifier 15 comprises a rectifier bridge formed essentially of thyristors Tf1–Tf4 constituting the arms of the bridge.

Referring again to FIG. 18, the field rectifier firing angle determining circuit 24 comprises a wave reforming circuit 61 which receives the primary voltage signal $e_1$ and produces a square-wave synchronized signal SW1 which is in synchronism with the primary voltage $e_1$. The field rectifier firing angle determining circuit 24 also comprises a firing angle generator 62 which receives the synchronized signal SW1 and the target value signal $E_f$ and produces gate pulses which are fed through respective gate amplifier elements of the gate amplifier 21 (FIG. 4) to the respective thyristors Tf1–Tf4.

The main rectifier firing angle determining circuit 25 comprises a wave reforming circuit 71, which is similar to the wave reforming circuit 61, and produces a square-wave synchronized signal SW2 which is in synchronism with the primary voltage $e_1$. A sign detector 72 detects the sign (+ or −) of the target value $E_D$ and produces a signal SGN indicative of the sign. An absolute value detector 73 detects the absolute value $|E_D|$ of the target value $E_d$ and produces a signal indicative of the absolute value $|E_D|$. A voltage allocator 74 receives the absolute value $|E_D|$ and performs an operation to allocate the voltage between the rectifier bridges, and produces signals $|E_{D1}|$ and $|E_{D2}|$ representing the allocations. The algorithm used in the operation is as follows:

When $$0 \leq |E_D| \leq E_{D1\ max},$$

($E_{D1\ max}$ being the maximum value for $E_{D1}$) then $$|E_{D1}| = |E_D|$$

$$|E_{D2}| = 0$$

When $$|E_D| > E_{D1\ max},$$

$$|E_{D1}| = |E_D| - E_{D1\ max}$$

$$|E_{D2}| = E_{D1\ max}.$$

It is noted $E_{D1\ max}$ and $E_{D2\ max}$ (the maximum value for $E_{D2}$) are usually made equal to each other by suitable determination of the winding ratio of the transformer. It follows that for the entire range of $$-2E_{D1\ max} \leq E_D \leq 2E_{D1\ max},$$

the relationship $$E_D = E_{D1} + E_{D2}$$

is satisfied.

Multipliers 75 and 76 respectively multiply the absolute value signals $|E_{D1}|$ and $|E_{D2}|$ by the sign SGN to produce allocation target values $E_{D1}$ and $E_{D2}$ with a sign. Firing angle generators 77 and 78 receives the allocation target values $E_{D1}$ and $E_{D2}$ and produce gate pulses, which are fed through respective gate amplifier elements of the gate amplifier 22 (FIG. 4) to the respective thyristors T11-T14 and T21-T24 of the rectifier bridges 14a and 14b.

Production of gate pulses in accordance with the target values $E_{D1}$, $E_{D2}$ or $E_f$ can be accomplished in any of the well-known manner. Examples of literature disclosing the techniques usable are (1) an article entitled "Fully controlled regenerative bridges with half-controlled characteristics" in Proceedings of the Institution of Electrical Engineers, Vol. 125, No. 2, February 1978; pages 109–112, particularly page 110; and (2) an article entitled "A Study of Asymmetrical Gating for Phase-Controlled Converters" in IEEE Transactions on Industry Applications, May/June 1972; pages 289–295, particularly pages 290 and 291. These publications are incorporated herein by reference.

Referring again to FIG. 5, how the corrected target value $E_D$ is derived will now be described.

An abrupt change detection circuit 26 is connected to receive the signal $e_1$ indicative of the primary voltage $e_1$ from the PT 16, and the power running/regeneration command signal, and monitors the primary voltage $e_1$, and produces an abrupt change detection signal $T_E$, upon detection of an abrupt rise during power running and an abrupt fall during regeneration.

A correction circuit 27 is responsive to the abrupt change detection signal $T_E$ for correcting the target value $E_d$ to provide a corrected main rectifier voltage target signal having a corrected target value $E_D$. The correction is done to avoid abrupt change in the actual voltage $e_d$ even when the primary voltage $e_1$ abruptly rises during power running and abruptly falls during regeneration.

Figure 6:
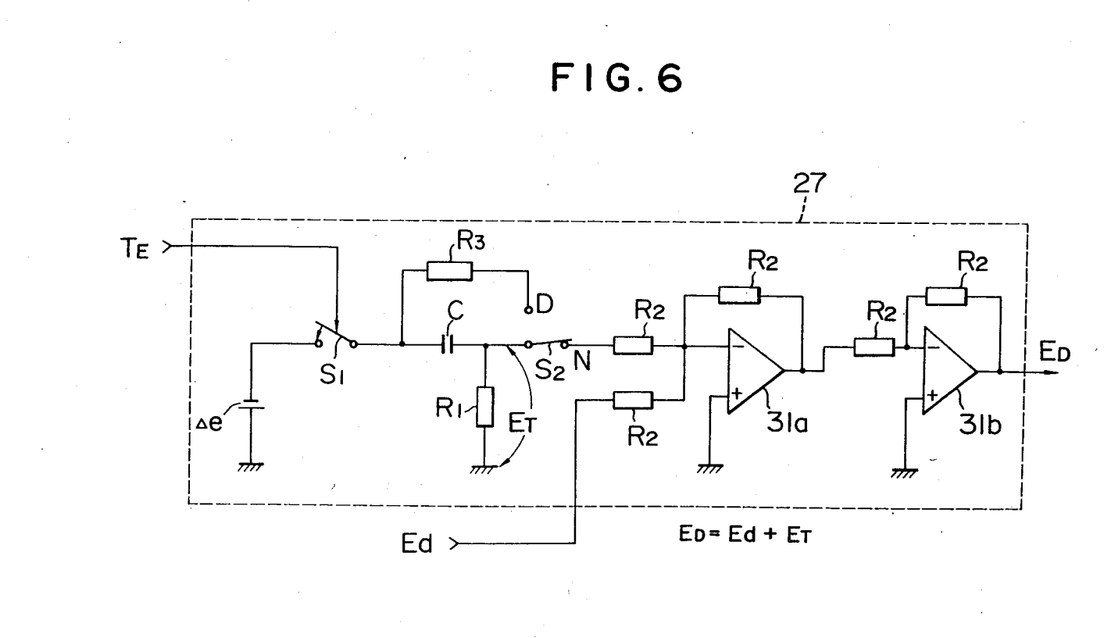
FIG. 6 is a circuit diagram showing an example of a correction circuit 27 shown in FIG. 5.

FIG. 6 shows an example of a correction circuit 27. Normally, a switch $S_1$ is off and a switch $S_2$ is on the side N (as illustrated). The voltage $E_T$ across a resistor $R_1$, i.e., one input to an adder 31a, is therefore zero. As a result, the output $E_D$ of an inverter 31b, which constitutes the output of the correction circuit 27, is equal to another input $E_d$, from the output voltage determining circuit 23. In this state, $E_D = E_d$.

Figure 7A:
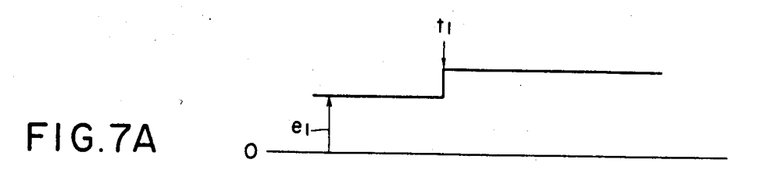
FIGS. 7a-7f are time charts showing values of various voltages and currents.
Figure 7B:
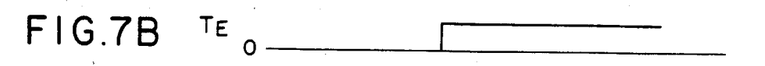
Figure 7C:
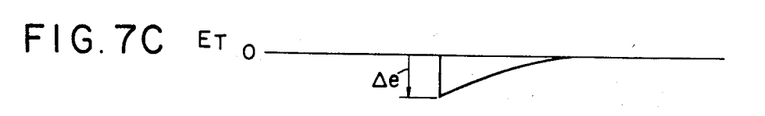
Figure 7D:
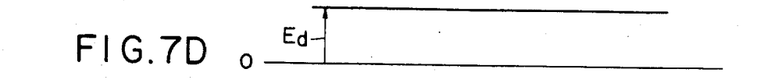
Figure 16A:
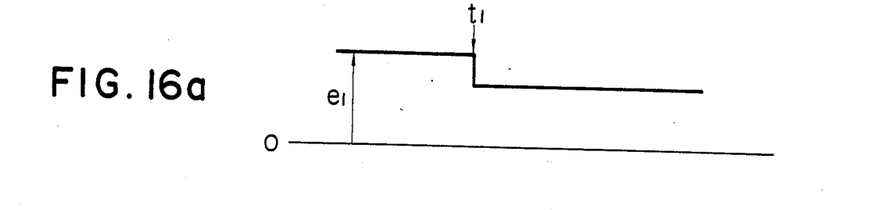
FIGS. 16a–16f are time charts showing values of various voltages and currents.
Figure 16B:
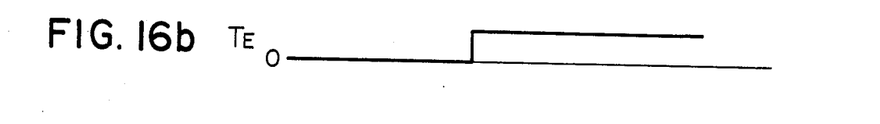
Figure 16C:
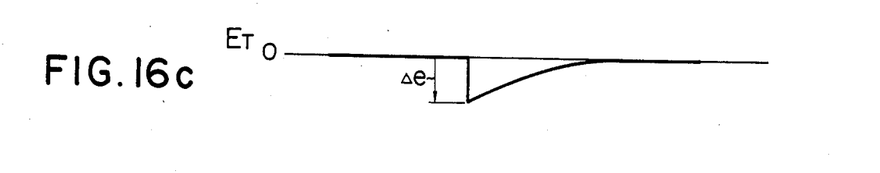
Figure 16D:
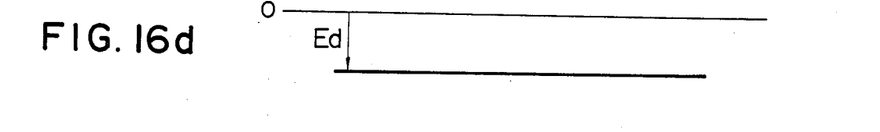

When the primary voltage $e_1$ rises abruptly during power running or falls abruptly during regeneration at a time point $t_1$ in FIGS. 7a–7f (rise) or FIGS. 16a–16f (fall), and this abrupt change is detected, the signal $T_E$ is produced to turn the switch $S_1$ on. The voltage $E_T$ will then vary as shown in FIG. 7c or FIG. 16c. As shown this voltage is suddenly decreased by a certain amount $\Delta e$ (the voltage of the battery $\Delta e$) upon the detection of the abrupt change in the primary voltage $e_1$ and is gradually returned to zero along an exponential curve. More specifically, the value of the voltage $E_T$ is given by:

$$-\Delta e \cdot \exp(-t/\tau)$$

where $\Delta e$ represents the voltage of the battery (also identified by $\Delta e$), and is made to have a value causing a change of 20–30% of the primary voltage of 25 KV, for example, t represents the time starting with the closure of the switch $S_1$ i.e., the detection of the abrupt change in the primary voltage, and $\tau$ represents a predetermined time constant determined by the capacitor C and the resistor $R_1$ and made to have a value substantially equal to or a little less than the time constant of the field winding.

Figure 7E:
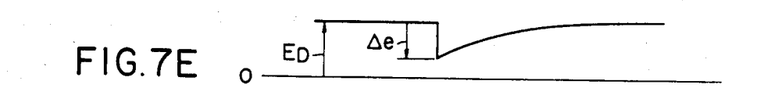
Figure 7F:
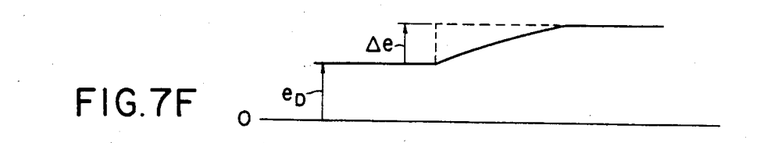
Figure 16E:
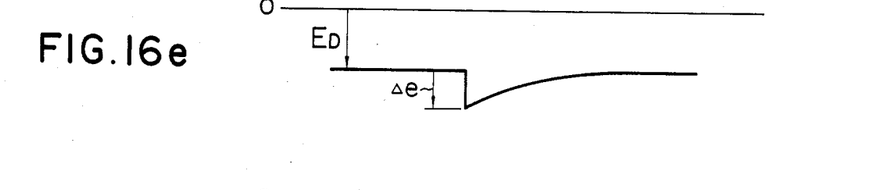
Figure 16F:
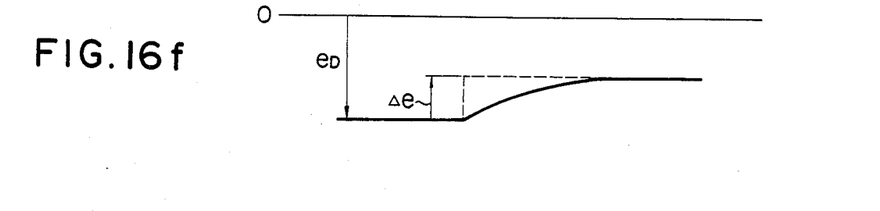

The corrected target value $E_D$, which is the sum of $E_d$ and $E_T$ will then be as shown in FIG. 7e or 16e and is given by:

$$E_d - \Delta e \cdot \exp(-t/\tau)$$

It will be seen that the corrected target value $E_D$, when used in determining the firing angle, tends to lower (make less positive or more negative) the output voltage of the main rectifier 14. The arrangement is such that this tendency cancels or counterbalances the direct tendency of increase in the output voltage $e_d$ due to increase in the primary voltage during power running or of decrease in the output voltage $e_d$ due to decrease in the primary voltage during regeneration. Thus, little variation occurs in the output voltage $e_D$ even when the primary voltage $e_1$ abruptly change. If the amount of abrupt change in the primary voltage $e_1$ and the amount of the abrupt change in $e_D$, which would occur if the compensation were not done, are of the corresponding level, no abrupt change will occur in $e_D$.

The charge accumulated on the capacitor C is gradually discharged and the voltage diminishes at a time constant dependent on the capacitor C and the resistor $R_1$. The voltage $E_D$ therefore changes gradually. When the voltage $E_T$ has fallen to a certain small level ($\approx 0$ V), the switch $S_2$ is turned to the side "D", and the capacitor C is completely discharged to be ready for next compensating operation.

Thus, the voltage outputted from the main rectifier 14 does not change abruptly, so that an abrupt change in the armature current $I_a$ is avoided. As a result, the danger of flashover is eliminated, and the motor can be connected to operate as a separately excited motor.

As has been described, according to the invention, a DC electric motor of an AC electric motor vehicle can be made to operate as a separately excited motor without flashover, so that the DC motor can be connected to operate as a separately excited motor. As a result, the main circuitry of the vehicle is simple and the cost and the weight can be reduced.

Figure 8:
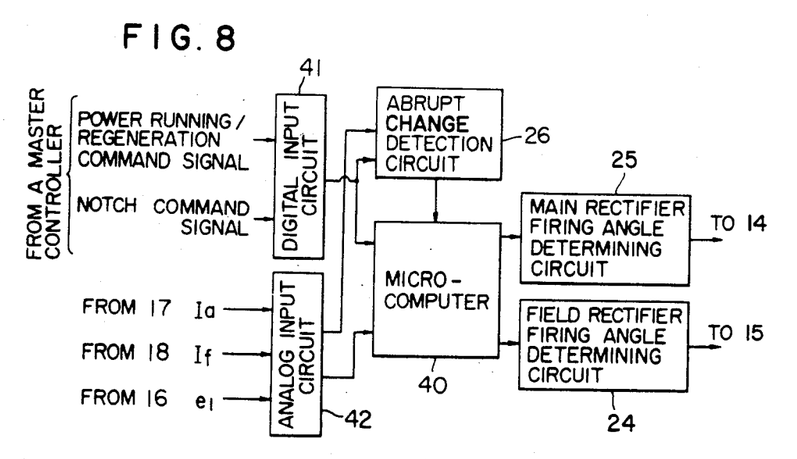
FIG. 8 is a block diagram showing an example of arrangement wherein a microcomputer is used.

The output voltage determining circuit 23 and the correction circuit 27 may be in the form of a programmed computer such as a programmed microcomputer. In this case the hardware construction of the firing angle control system will be, for example, as shown in FIG. 8, in which a microcomputer 40 serving as the circuits 23 and 27 is connected to receive through a digital input circuit 41 a power running/regeneration command signal, and a notch command signal, and through an analog input circuit 42 the detected armature current $I_a$ and the detected field current $I_f$. The abrupt change detection circuit 26 is connected to receive through the analog input circuit 42 the detected primary voltage $e_1$.

Figure 9:
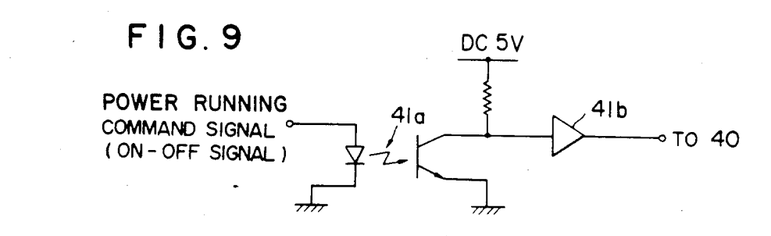
FIGS. 9 and 10 are circuit diagrams showing examples of portions of input circuits.

The portion of the digital input circuit 41 which transmits the power running command signal may for example be as shown in FIG. 9. In this case, the power running command signal is in the form of a logic signal which is at High level when the power running operation mode is selected by the motorman. As illustrated, this portion of the input circuit 41 comprises a photocoupler 41a and an amplifier 41b connected as illustrated.

Figure 10:
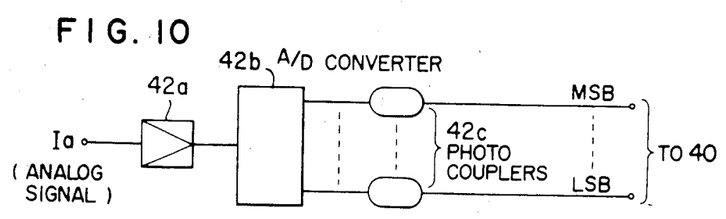

That portion of the analog input circuit 42 which digitizes the analog signal indicative of the detected armature current Ia may, for example, be as shown in FIG. 10. As shown it comprises an amplifier 42a, and A/D (analog to digital) converter 42b which provides a parallel-bit digital signal, and photo-couplers 42c connected as illustrated.

That portion of the analog input circuit 42 which digitizes the analog signal indicative of the detected field current may have a similar construction.

Figure 11:
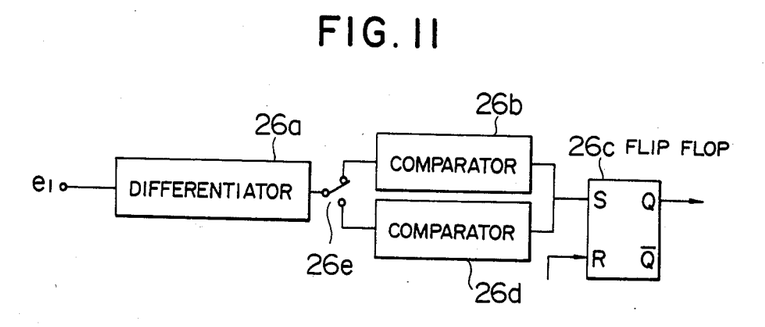
FIG. 11 is a block diagram showing an example of an abrupt change detection circuit.

An example of the abrupt change detection circuit 26 is shown in FIG. 11. As shown it comprises a differentiator 26a for differentiating the detected value of the primary voltage $e_1$, a first comparator 26b, a second comparator 26d and a switch 26e. The switch 26e is controlled by the power running/regeneration command signal, and connects the output of the differentiator 26a to the first comparator 26b when the power running mode is selected, and connects the output of the differentiator 26a to the second comparator 26d when the regeneration mode is selected. The first comparator 26b compares the input with a first predetermined level of a positive value and produces a pulse when the input exceeds the first predetermined level. The second comparator 26d compares the input with a second predetermined level of a negative value and produces a pulse when the input is lower than the second predetermined level. The abrupt change detection circuit 26 further comprises a flip-flop 26c which is set by the pulse of the comparator 26b or 26d, and whose output at the terminal Q constitutes the abrupt change detection signal.

The abrupt change detection circuit may alternatively comprise a sample-hold circuit periodically sampling the primary voltage detected value, comparing the last sampled value with a previously sampled value and judging that an abrupt change has occurred when the difference or ratio between the compared values exceeds a preselected threshold.

In the embodiment described, the primary voltage of the transformer 5 is monitored for detection of an abrupt change. What is essential is, however, to monitor the AC voltage of the converting device (14, 15) and the specific point at which the voltage is monitored is not critical as far as the voltage monitored is the AC voltage of the converting device. For example, the secondary voltage of the transformer 5 may alternatively be monitored.

What is claimed is:

1. A firing angle control system for a converting device for an AC electric motor-vehicle fed with AC electric power from an AC power supply and having, as its main electric motor, a DC electric motor comprising an armature and a field winding, said converting device including a main rectifier and a field rectifier and receiving said AC electric power, said main rectifier including gate controlled rectifier elements and being adapted to convert the AC electric power into DC electric power to be supplied to the armature of the DC electric motor during power running, and to invert DC electric power which is generated by the DC electric motor into AC electric power during regeneration, and said field rectifier including gate controlled rectifier elements and being adapted to convert the AC electric power into DC electric power to be supplied to the field winding of the DC electric motor, said system comprising:

a voltage determining circuit receiving operation command signals including a power running/regeneration command signal and a notch command signal from a master controller, and an armature current signal indicative of a detected armature current and a field current signal indicative of a detected field current, determining target values of DC voltages of the main rectifier and the field rectifier, respectively, and producing a main rectifier voltage target signal indicative of the target value of the DC voltage of the main rectifier and a field rectifier voltage target signal indicative of the target value of the DC voltage of the field rectifier, an abrupt change detection circuit monitoring an AC voltage of said AC power fed to the converting device and producing an abrupt change detection signal when said abrupt change detection circuit detects an abrupt change in the AC voltage, a correction circuit receiving the main rectifier voltage target signal and the abrupt change detection signal, and producing a corrected main rectifier voltage signal, a main rectifier firing angle determining circuit determining, in accordance with the corrected main rectifier voltage signal, a firing angle of each of the gate controlled rectifier elements of the main rectifier and producing firing pulses for the respective gate controlled rectifier elements at the respective firing angles, and a field rectifier firing angle determining circuit determining, in accordance with the field rectifier voltage signal, a firing angle of each of the gate controlled rectifier elements of the field rectifier and producing firing pulses for the respective gate controlled rectifier elements at the respective firing angles, the corrected main rectifier voltage signal having a value determined to compensate for a difference in the rate of change between an armature current and a field current which would occur after the abrupt change if the correction were not made.

2. A system as set forth in claim 1, wherein said correction circuit is adapted to produce the corrected main rectifier voltage signal having a value that is suddenly changed, by a predetermined amount, upon the detection of the abrupt change, and is gradually returned to an original level.

3. A system as set forth in claim 2, wherein the gradual return to the original level is along an exponential curve.

4. A system as set forth in claim 3, wherein the value of the corrected main rectifier voltage target signal is given by:

$$E_D = E_d - \Delta e \cdot \exp(-t/\tau)$$

where $E_D$ represents the value of the corrected main rectifier voltage target signal, $E_d$ represents the value of the main rectified voltage target signal as inputted to the correction circuit, $\Delta e$ represents a predetermined constant and signifies the amount by which the value of the corrected main rectifier voltage signal is suddenly changed upon the detection of the abrupt change, t represents a time starting with the detection of the abrupt change, and $\tau$ represents a predetermined constant.

5. A system as set forth in claim 4, wherein said correction circuit comprises:
means for producing a correction signal having a value given by:

$$-\Delta e \cdot \exp(-t/\tau)$$

and
means for adding the value of the correction signal and the value of the main rectifier voltage target signal as inputted to the correction circuit and for producing the corrected main rectifier voltage target signal having a value equal to the sum of the two values.

6. A system as set forth in claim 1, wherein the compensation by the correction circuit is made when the electric motor is in power running and the abrupt change is in the form of an abrupt rise.

7. A system as set forth in claim 1, wherein the compensation by the correction circuit is made when the electric motor is in regeneration and the abrupt change is in the form of an abrupt fall.

8. A system as set forth in claim 1, wherein the abrupt change detection circuit comprises:
a differentiator for differentiating the detected value of the AC voltage of the converting device and for producing a differential value indicating a rate of change of said AC voltage, and
a comparator responsive to said differentiator and comparing the differential value with a predetermined value,
said abrupt change detection signal being produced when the differential value exceeds the predetermined value.

9. A device for controllably converting AC power from an AC power source into DC power for a DC electric motor comprising:
means including a first plurality of gate controlled rectifier elements and connected to said AC power source and to an armature of said DC motor for rectifying said AC power to produce DC power for said armature of said DC motor,
means including a second plurality of gate controlled rectifier elements and connected to said AC power source and a field winding of said DC motor for rectifying said AC power to produce DC power for said field winding of said DC motor;
means responsively connected to said armature, for sensing an amount of current flowing through said armature, and for producing an armature current signal indicative thereof,
means, responsively connected to said field winding, for sensing an amount of current flowing through said field winding, and for producing a field winding current signal indicative thereof;
means, connected to said AC power source, for sensing a voltage of said AC power source and for producing a primary voltage signal indicative thereof;
means, responsive to said armature current signal and said field winding signal, for generating a main rectifier voltage signal and a field rectifier voltage signal in accordance therewith;
means, responsive to said primary voltage signal, for detecting an abrupt change in said primary voltage signal and for generating an abrupt change signal when said abrupt change is detected;
means, responsive to said abrupt change signal, for correcting said main rectifier voltage signal in response to the presence of said abrupt change signal, thus to offset a difference between the rate of change of said armature current and the rate of change of said field winding current in response to said abrupt change which would occur absent said correcting, and so for generating a corrected main rectifier voltage signal;
means, responsive to said corrected main rectifier voltage signal, for controlling the firing of said first plurality of gate controlled rectifiers in accordance with said corrected main rectifier voltage signal; and
means, responsive to said field rectifier voltage signal, for controlling firing of said second plurality of gate controlled rectifiers in accordance with said field rectifier voltage signal.

* * * * *